United States Patent [19]

Goscenski, Jr.

[11] 4,266,445
[45] May 12, 1981

[54] LOCKING DIFFERENTIAL

[75] Inventor: Edward J. Goscenski, Jr., Battle Creek, Mich.

[73] Assignee: Eaton Corporation, Cleveland, Ohio

[21] Appl. No.: 22,664

[22] Filed: Mar. 22, 1979

[51] Int. Cl.$^3$ ............................................. F16H 1/44
[52] U.S. Cl. ........................................ 74/711; 192/35
[58] Field of Search ................... 74/710.5, 711; 192/35

[56] References Cited

U.S. PATENT DOCUMENTS

| Re. 28,004 | 5/1974 | Ottemann | 74/711 |
|---|---|---|---|
| 3,261,230 | 7/1966 | Rudnicki | 74/710.5 |
| 3,369,428 | 2/1968 | Hughson | 74/710.5 |
| 3,523,467 | 8/1970 | Shachter | 74/711 |
| 3,818,781 | 6/1974 | Goscenski | 74/711 |
| 3,831,462 | 8/1974 | Baremor | 74/711 |

Primary Examiner—Louis Rimrodt
Attorney, Agent, or Firm—R. J. McCloskey; J. Yakimow; L. Kasper

[57] ABSTRACT

A differential gear mechanism of the limited slip type is provided. The mechanism includes a clutch, including a plurality of discs (31 and 33), and a cam mechanism including a main cam member (43) and an intermediate cam member (45). The intermediate cam member is splined to the side gear (19), such that axial forces are not transmitted to the side gear. The main cam member (43) defines a set of internal gear teeth (81), engaging an externally toothed member (79) of an acutating mechanism (71). The arrangement of the cam members and the provision of the gear teeth on the inner periphery of the main cam member results in a differential gear mechanism having a substantially reduced "bearing span", combined with a reduced casing diameter.

13 Claims, 6 Drawing Figures

LOCKING DIFFERENTIAL

BACKGROUND OF THE DISCLOSURE

The present invention relates generally to differential gear mechanisms, and more particularly, to such mechanisms of the type commonly referred to as "locking differentials".

Differential gear mechanisms of the type to which the present invention applies are broadly referred to as "limited slip differentials" and typically include a clutch pack which is operable to limit or retard differentiating action between the output gears (side gears). More specifically, however, the present invention is intended for use on limited slip differentials of the type referred to as "locking differentials", and will be described in connection therewith. In a locking differential, means are provided for engaging or locking the clutch set, rather than permitting it to slip, to substantially reduce the amount of differentiating action permitted between the side gears.

Locking differentials of various types are now generally well known in the art, including both interaxle lockers, and inter-wheel lockers. Inter-wheel locking differentials may be applied either to conventional rear-wheel drive vehicles, or to the more recent front-wheel drive vehicles. Although the present invention may be utilized to advantage in any of the above-described types of locking differential, it is especially advantageous when applied to an inter-wheel, front-wheel drive vehicle, and will be described in connection therewith.

As is now quite well known to those involved in the design of front-wheel drive vehicles, especially the "compact" and "subcompact" automobiles, one of the major problems involves the limited amount of space available for the various engine and drive train components and accessories. The lack of space becomes especially difficult in the case of a component which is "optional" to the vehicle purchaser, and which is larger than the standard component being replaced. Such is the case with a locking differential replacing a conventional, open differential.

In the case of a locking differential, the space problem is compounded by the dimensional limitations imposed in regard to both the axial length and the gear case outside diameter. For example, because of the location of the surrounding components and accessories, there may be a specified maximum "bearing span", i.e., the axial distance between the two sets of bearings which provide rotational support for the locking differential mechanism, relative to the main, outer casing. At the same time, the location of adjacent components may result in a specified maximum casing diameter, over at least a major portion of the axial extent of the locking differential. In the prior art locking differentials of the type including an actuating means for locking up the clutch set, such as is illustrated in U.S. Pat. No. Re. 28,004, assigned to the assignee of the present invention, the clutch set has typically been disposed axially from one of the side gears. In such an arrangement, the side gear and a cam member disposed between the side gear and the clutch set define cooperating cam surfaces, such that retarding rotation of the cam member relative to the side gear causes axial movement of the cam member, locking the clutch set and minimizing differentiating action. However, such an arrangement results in a locking differential unit which would substantially exceed the "bearing span" available in front-wheel drive applications.

Accordingly, it is an object of the present invention to provide a differential gear mechanism of the locking differential type having a substantially reduced axial length.

It is a more specific object of the present invention to provide a locking differential in which the axial length is no more than would be required for a comparable open differential.

It is another object of the present invention to provide a locking differential mechanism which accomplishes the above-stated objects and in addition, has a minimum gear case diameter.

It is a more specific object of the present invention to provide a lockup mechanism (i.e., clutch set and cam mechanism), which makes it possible to minimize the distance from the actuating mechanism to the axis of rotation of the differential unit.

In prior art locking differentials of the type described above, wherein the cam mechanism includes one of the side gears, axial forces generated during the camming action are transmitted to the side gear, biasing it toward the opposite side gear. It has been necessary in such prior art locking differentials to provide some sort of thrust takeup device, such as a reaction block, between the side gears, to maintain the predetermined axial separation between the side gears, and prevent gear tooth wedging or splitting. Thus, the axial forces on the one side gear are transmitted to the opposite side gear and then to the casing, typically through a thrust washer. Such axial forces require, in addition to the reaction block, a sturdier casing, bolts, etc.

Accordingly, it is an object of the present invention to provide a differential gear mechanism of the locking differential type which substantially reduces the axial forces transmitted to the side gear during actuation of the lockup mechanism.

It is a more specific object of the present invention to provide a locking differential which achieves the above-stated object to the extent that no reaction block or other thrust member, other than the pinion gears, is required in order to maintain the axial separation between the side gears.

SUMMARY OF THE INVENTION

The above and other objects of the present invention are accomplished by the provision of an improved differential gear mechanism comprising a gear case defining a gear chamber and a differential gear means disposed in the gear chamber. The differential gear means includes at least one input gear and first and second output gears. The mechanism includes lockup means for locking up the differential gear means to retard differentiating action, and actuating means for actuating the lockup means. The lockup means includes clutch means operable between an engaged condition, effective to retard relative rotation between the gear case and the output gears, and a disengaged condition. The lockup means further includes cam means extending radially outwardly from the first output gear and being operatively associated therewith. The cam means includes a pair of cam members, one of the cam members being movable relative to the other cam member to effect the engaged condition of the clutch means. The cam members include a main cam member defining an inner peripheral retarding surface disposed radially outwardly of the first output gear. The actuating means includes retarding means operable to engage the retarding surface and retard rotation of the main cam member.

DESCRIPTION OF THE PREFERRED EMBODIMENT

Figure 1:
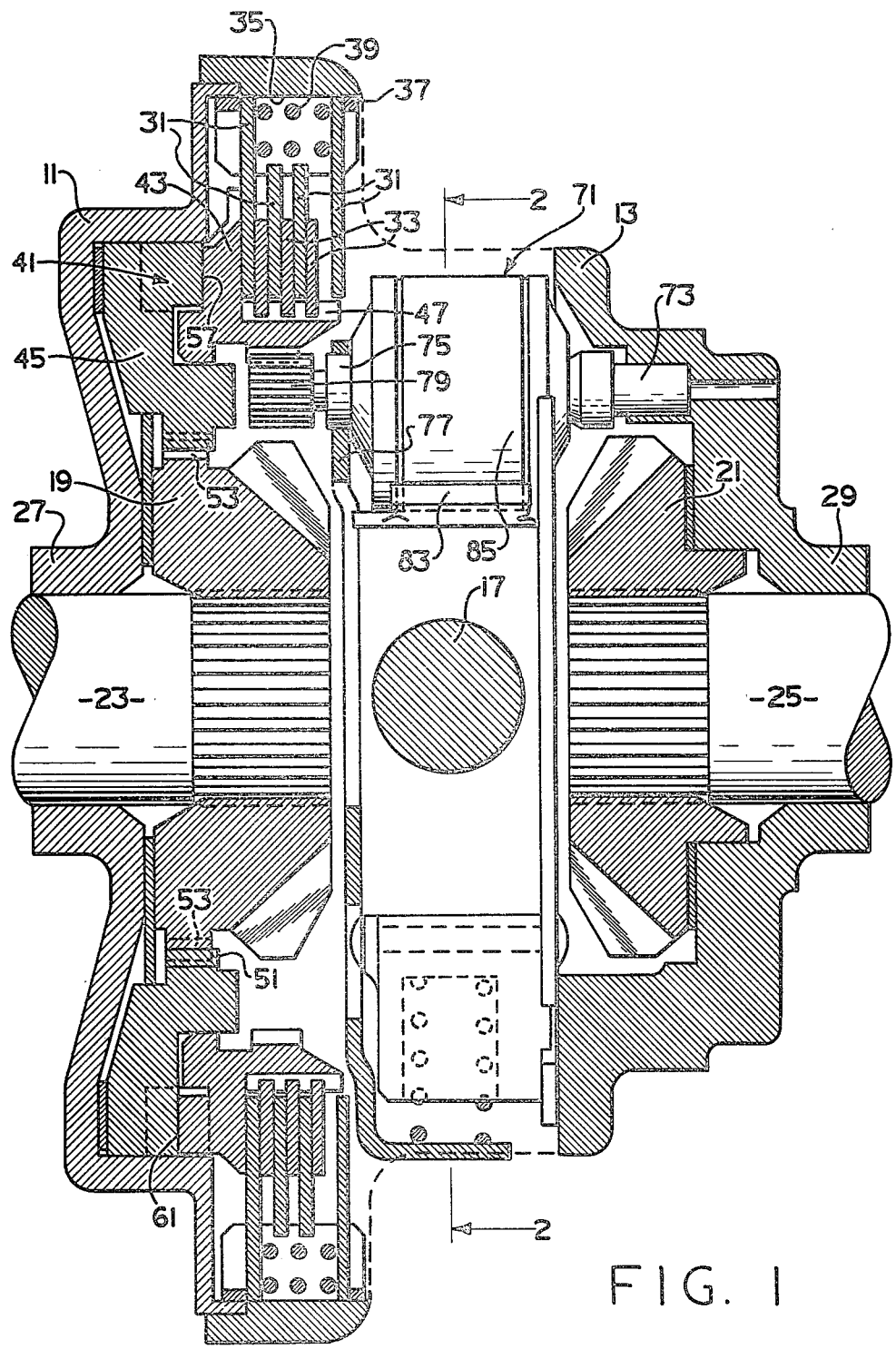
FIG. 1 is an axial cross section of a locking differential gear mechanism made in accordance with the present invention.

Referring now to the drawings, which are not intended to limit the present invention, FIG. 1 is an axial cross-section of a differential gear mechanism made in accordance with the present invention. The differential gear mechanism includes a gear case comprising a lefthand casing section 11 and a righthand casing section 13. Torque input to the gear mechanism is typically by means of an input gear (not shown), which may be bolted to the casing section 13.

Figure 2:
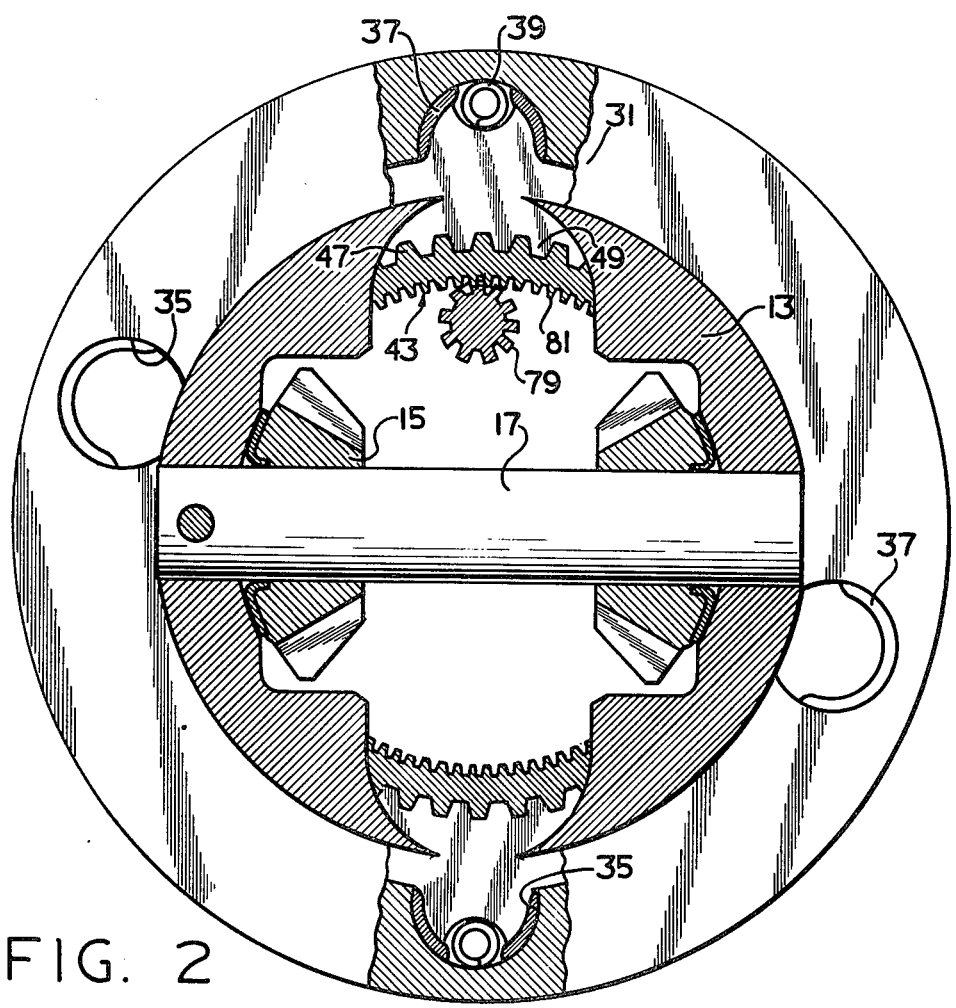
FIG. 2 is a transverse cross section, taken generally along line 2—2 of FIG. 1, but on a smaller scale, and with the actuating mechanism removed, and a portion of FIG. 2 taken through the clutch pack and main cam member.

Disposed within the gear case is a differential gear set including a pair of planet pinions 15 (see FIG. 2), rotatably mounted on a pinion shaft 17 which, in turn, is secured to the casing section 13. The planet pinions 15 comprise the input gears of the differential gear set and are in meshing engagement with a pair of side gears 19 and 21, which comprise the output gears of the differential gear set. The side gears 19 and 21 are splined to a pair of axle shafts 23 and 25, respectively. The casing sections 11 and 13 include annular hub portions 27 and 29, respectively, on which are mounted the bearing sets (not shown) used to provide rotational support for the differential gear mechanism, relative to the main, outer casing (not shown).

During normal, straight-ahead operation of the vehicle, no differentiating action occurs between the left and right axle shafts 23 and 25, and the pinions 15 do not rotate relative to the pinion shaft 17, such that the casing sections 11 and 13, the pinions 15, the side gears 19 and 21 and the axle shafts 23 and 25 all rotate about the axis of the shafts 23 and 25 as a solid unit.

Under certain operating conditions, such as when the vehicle is turning, or a slight loss of traction occurs, it is permissible for a certain amount of differentiating action ot occur between the side gears 19 and 21, up to a predetermined level. Above that predetermined level of differentiating action (e.g., a difference of 100 rpm between the side gears), it is desirable to retard the relative rotation between the gear case and the side gears, to prevent excessive differentiating action.

In order to retard differentiating action, the differential gear mechanism of the present invention is provided with a lockup means for locking up the differential gear set, and an actuating means for actuating the lockup means. In the subject embodiment, the lockup means comprises a clutch mechanism including a plurality of clutch discs 31 and a plurality of clutch discs 33. As may best be seen by viewing FIG. 2, in conjunction with FIG. 1, the casing section 13 defines a plurality of semi-cylindrical openings 35. In the subject embodiment, there are four of the openings 35, and disposed within each opening is a semi-cylindrical guide member 37 which helps to guide the clutch discs 31. Disposed within each of the guide members 37 is a helical compression spring 39 which seats, at its opposite ends, against the lefthand and righthand clutch discs 31. As may be seen in FIGS. 1 and 2, the two inner clutch discs 31 each define a generally semi-circular cutout to facilitate the spring 39. The biasing force exerted by the springs 39 must be sufficient to maintain the clutch discs 31 and 33 in the disengaged condition shown in FIG. 1, in the absence of other forces biasing the clutch discs together.

Figure 5:
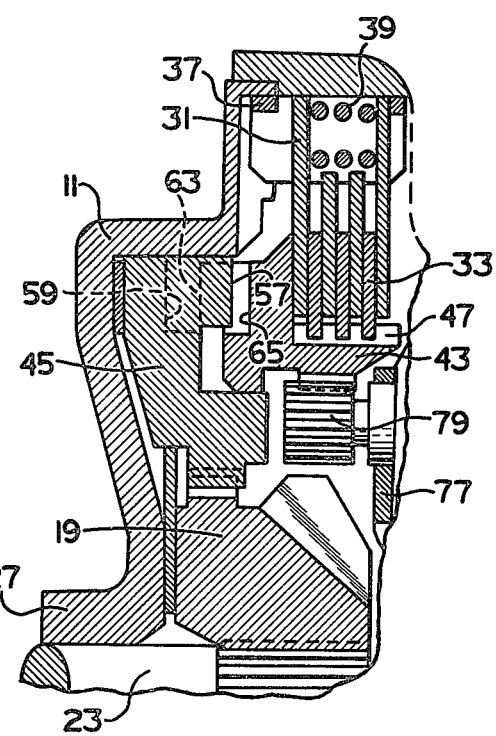
FIG. 5 is a fragmentary view, similar to FIG. 1, illustrating the lockup means of the invention in the engaged condition.

The lockup means further includes a cam mechanism, generally designated 41. As is generally well known to those skilled in the limited slip differential art, one function of the cam mechanism 41 is to effect movement of the clutch mechanism from the disengaged condition shown in FIG. 1, to an engaged condition, as shown in FIG. 5. In the subject embodiment of the present invention, the cam mechanism 41 includes a main cam member 43 and an intermediate cam member 45. As may best be seen in FIG. 2, the main cam member 43 defines a set of external splines 47, and the clutch discs 33 define a set of internal splines 49, such that the clutch discs 33 are splined to the main cam member 43 for rotation therewith.

Figure 3:
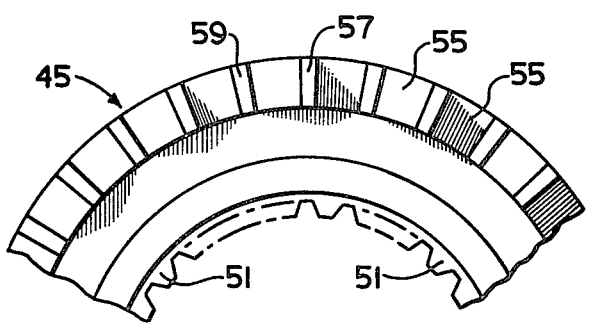
FIG. 3 is a fragmentary plan view of the intermediate cam member, on the same scale as FIG. 2.

As may be seen by viewing FIG. 3, in conjunction with FIG. 1, the intermediate cam member 45 defines a set of straight, internal splines 51 which are in meshing engagement with a set of straight, external splines 53 formed about the outer periphery of the side gear 19. Thus, the intermediate cam member 45 is splined to the side gear 19 for rotation therewith, such that the forces transmitted from the intermediate cam member 45 to the side gear 19 are only rotational, with no substantial axial forces being transmitted to the side gear 19. The intermediate cam member 45 defines a plurality of cam ramp surfaces 55 which are interconnected, alternately, by top surfaces 57 and bottom surfaces 59.

Figure 4:
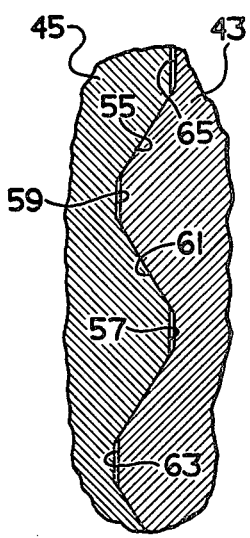
FIG. 4 is a fragmentary, somewhat schematic view of the cam members in meshing engagement.

As may be seen in FIG. 4, the main cam member 43 defines cam surfaces which cooperate with those defined by the intermediate cam member 45. The main cam member 43 defines a plurality of cam ramp surfaces 61 which are interconnected, alternately, by top surfaces 63 and bottom surfaces 65. As is well known to those skilled in the art, the relative rotational position of the cam members 43 and 45 shown in FIG. 4, with the cam ramp surfaces 55 and 61 in meshing engagement, corresponds to the disengaged condition of the clutch mechanism shown in FIG. 1. During normal, straight-ahead operation of the vehicle, with little or no differentiating action occurring, the main cam member 43 and the intermediate cam member 45 remain in the position shown in FIG. 4 and rotate with the side gear 19, at the same rotational speed.

Figure 6:
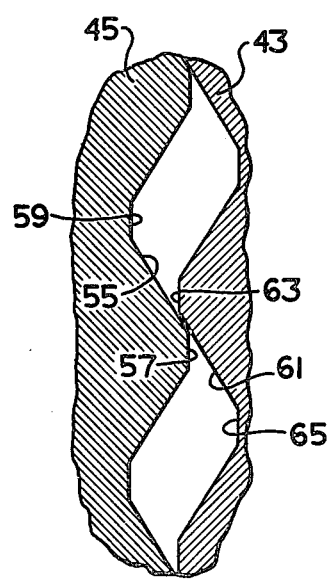
FIG. 6 is a somewhat schematic view, similar to FIG. 4, illustrating the cam members in the "ramped" position.

As is also generally well known to those skilled in the art, movement of the clutch mechanism to the engaged condition (FIG. 5), may be accomplished by retarding rotation of the main cam member 43, relative to the intermediate cam member 45. Such relative rotation between the cam members 43 and 45 will cause "ramping" of the ramp surfaces 55 and 61, as shown in FIG. 6, resulting in axial movement of the main cam member 43 to the position shown in FIG. 5. Such movement of the cam member 43 is in opposition to the biasing force of the springs 39. Preferably, the lockup means utilized with the present invention is of the "self-energizing" type, i.e., the coefficient of friction of the discs 31 and 33 and the cam angle (angle of ramp surfaces 55 and 61) are selected such that the cam member 43 would ramp and lock the clutch pack as a result of frictional drag between the discs, in the absence of the springs 39.

However, under normal operating conditions, the springs 39 prevent the discs from exerting sufficient drag on the cam member 43 to cause it to ramp. When the retarding torque on the main cam member is sufficient to overcome the force of the springs 39, ramping and locking of the clutch pack will occur. The lockup means will remain actuated (with the differential gear set locked up) until the torque difference across the lockup means is substantially eliminated (e.g., both wheels turning at the same speed, with full traction) at which time the springs 39 disengage the clutch pack.

In order to retard rotation of the main cam member 43, relative to the intermediate cam member 45, the differential gear mechanism of the present invention includes a retarding mechanism, generally designated 71, which comprises the actuating means for actuating the lockup means. It should become apparent to those skilled in the art, from the subsequent description, that within the scope of the present invention, many different configurations and types of retarding mechanism may be utilized. In the subject embodiment, the retarding mechanism 71 is of the flyweight type, illustrated and described in greater detail in U.S. Pat. No. Re. 28,004, assigned to the assignee of the present invention. The flyweight mechanism 71 is mounted for rotation about its own axis, and includes a cylindrical portion 73, rotatably supported by a casing section 13. The mechanism 71 further includes a cylindrical portion 75, rotatably supported by a bracket member 77. As may best be seen in FIG. 2, the flyweight mechanism 71 includes an externally geared member 79 which is in engagement with a set of internal gear teeth 81, formed on the inner periphery of the main cam member 43. In the subject embodiment, and by way of example only, the internal gear teeth 81 comprise the retarding surface, which cooperates with the retarding mechanism 71 to accomplish retarded rotation of the main cam member 43, relative to the intermediate cam member 45.

During operation, if differentiating action begins to occur between the axle shafts 23 and 25, and thus between the side gears 19 and 21, the cam members 43 and 45 will begin to rotate in unison at a speed different than that of the gear casing (including casing section 13). As a result of this speed difference, and the toothed engagement between member 79 and internal gear teeth 81, the flyweight mechanism 71 will begin to rotate about its own axis at a rotational speed which is a function of the extent of the differentiating action. As the speed of rotation of the flyweight mechanism 71 increases, centrifugal force causes the weights to move outward until one of the weights engages a stop mechanism, preventing further rotation of the flyweight mechanism 71 about its own axis of rotation.

The engagement of the member 79 (which is now nonrotatable) and the gear teeth 81 exerts the retarding force on the cam member 43 necessary to overcome the springs 39, as described previously. Various types of stop mechanism may be utilized, within the scope of the present invention, including the one illustrated in previously-referenced U.S. Pat. No. Re. 28,004. However, in the subject embodiment, the stop mechanism utilized is of the type illustrated and described in greater detail in copending U.S. application Ser. No. 22,662, filed Mar. 22, 1979, in the names of Edward J. Goscenski, Jr. and Phillip E. Konkle, entitled Lockout Mechanism For Locking Differential, and assigned to the assignee of the present invention. The stop mechanism includes a pair of stop tabs 83 (only one of which is seen in FIG. 1), each of which is operable to engage a particular one of the weights 85 as described previously.

As is well known to those skilled in the limited slip differential art, when rotation of the flyweight mechanism 71 is prevented, and rotation of the main cam member 43 relative to the intermediate cam member 45 is retarded, the main cam member 43 will move axially from the position shown in FIG. 1 to the position shown in FIG. 5, as a result of the ramping of the surfaces 55 and 61 as was described previously.

In the subject embodiment, the actuating means (retarding mechanism 71) is of the type which is actuated in response to the occurrence of a predetermined level of differentiating action. However, it should be understood that because the particular type or configuration of actuating means forms no part of the present invention, the mechanism 71 could be actuated in response to the occurrence of various other conditions. By way of example only, and not limitation, the means for actuating the lockup means could be actuated in response to a predetermined level of acceleration of differentiating action, or even in response to a "non-rotational" condition, such as the temperature of the clutch discs 31 and 33.

Similarly, it should be appreciated that the particular configuration of the cam mechanism illustrated herein is intended merely to illustrate the best mode, presently contemplated for the invention. It is, however, an essential feature of the present invention that the cam mechanism 41 extend radially outwardly from the side gear 19 and be operatively associated therewith. It is also an essential feature of the invention that the cam mechanism 41 include a pair of cam members, that one of the cam members be movable relative to the other to effect the engaged condition of the clutch, and that the cam mechanism include a main cam member which defines an inner peripheral retarding surface, such as the internal gear teeth 81, wherein the retarding surface is disposed radially outwardly of the side gear 19. Finally, it is an essential feature of the invention that an actuating means is provided, including a retarding mechanism which is operable to engage the retarding surface and retard rotation of the main cam member.

What is claimed is:

1. In a differential gear mechanism of the type including a gear case defining a gear chamber, differential gear means disposed in said gear chamber, said differential gear means including at least one input gear and first and second output gears, lockup means for locking up said differential gear means to retard differentiating action, actuating means for actuating said lockup means, said lockup means including clutch means operable between an engaged condition, effective to retard relative rotation between said gear case and said output gears, and a disengaged condition, said lockup means further including cam means operatively associated with said first output gear, said cam means including a pair of cam members, one of said cam members being movable relative to the other cam member to effect said engaged condition of said clutch means, said cam members including a main cam member, said actuating means including retarding means operable to engage said lockup means and retard rotation of said main cam member, the improvement comprising:

(a) said cam means extending radially outwardly from said first output gear;

(b) said main cam member defining an inner peripheral retarding surface disposed radially outwardly of said first output gear; and (c) said retarding means being operable to engage said retarding surface radially outwardly of said first output gear.

2. A differential gear mechanism as claimed in claim 1 wherein said retarding means is operable in response to the occurrence of at least a predetermined level of differentiating action.

3. A differential gear mechanism as claimed in claim 2 wherein said retarding means includes a flyweight mechanism rotatable about its own axis upon the occurrence of differentiating action and further includes means for preventing rotation of said flyweight mechanism in response to said predetermined level of differentiating action.

4. A differential gear mechanism as claimed in claim 3 wherein said inner peripheral retarding surface defines a set of internal gear teeth and said flyweight mechanism includes a rotatable, externally-toothed gear in engagement with said internal splines.

5. A differential gear mechanism as claimed in claim 1 wherein said one cam member comprises said main cam member and said other cam member comprises an intermediate cam member.

6. A differential gear mechanism as claimed in claim 5 wherein said main cam member and said intermediate cam member are operable to interact to effect axial movement of said main cam member in response to retarded rotation thereof.

7. A differential gear mechanism as claimed in claim 6 wherein said main cam member and said intermediate cam member define co-operating cam surfaces which effect said axial movement in response to relative rotation of said cam members.

8. A differential gear mechanism as claimed in claim 7 wherein said intermediate cam member is supported by said gear case to prevent axial movement of said intermediate cam member in a direction away from said main cam member.

9. A differential gear mechanism as claimed in claim 5 including means connecting said intermediate cam member for rotation with said first output gear.

10. A differential gear mechanism as claimed in claim 9 wherein said means connecting said intermediate cam member for rotation with said first output gear is effective to transmit substantially only rotational forces between said member and said gear.

11. A differential gear mechanism as claimed in claim 10 wherein said connecting means comprises a plurality of straight, external splines defined by said first output gear and a plurality of straight, internal splines defined by said intermediate cam member and in engagement with said external splines.

12. A differential gear mechanism as claimed in claim 1 wherein said main cam member defines a set of external splines and said clutch means includes a plurality of clutch discs in splined engagement with said external splines, said external splines being disposed radially outwardly from said inner peripheral retarding surface.

13. A locking differential mechanism comprising a gear case defining a gear chamber, differential gear means disposed in said gear chamber, said differential gear means including at least one input gear and first and second output gears, lockup means for locking up said differential gear means to retard differentiating action, and actuating means for actuating said lockup means, said locking means including clutch means operable between an engaged condition, effective to retard relative rotation between said gear case and said output gears, and a disengaged condition, said lockup means further including cam means comprising an intermediate cam member and a main cam member, said intermediate cam member being connected for rotation with said first output gear and extending radially outwardly from said first output gear, said main cam member being operatively associated with said clutch means whereby frictional drag generated in said clutch means is effective to retard rotation of said main cam member, said main cam member and said intermediate cam member defining cooperating cam surfaces operable to effect axial movement of said main cam member in response to relative rotation of said cam members, to effect said engaged condition of said clutch means, said main cam member defining an inner peripheral retarding surface disposed radially outwardly of said first output gear, and being axially disposed between said intermediate cam member and said second output gear, said actuating means including retarding means operable to engage said retarding surface and retard rotation of said cam member in response to the occurrence of at least a predetermined level of differentiating action.

* * * * *